United States Patent
Urakami et al.

(10) Patent No.: US 9,700,860 B2
(45) Date of Patent: Jul. 11, 2017

(54) MIXER PROVIDED WITH FLOATING WEIGHT MOVING MECHANISM

(71) Applicant: MITSUBISHI HEAVY INDUSTRIES MACHINERY TECHNOLOGY CORPORATION, Hiroshima-shi, Hiroshima (JP)

(72) Inventors: Yoshihito Urakami, Hiroshima (JP); Takashi Moribe, Hiroshima (JP); Shuichi Hanada, Hiroshima (JP); Kazuhito Takahashi, Hiroshima (JP); Jiro Agawa, Hiroshima (JP)

(73) Assignee: MITSUBISHI HEAVY INDUSTRIES MACHINERY TECHNOLOGY CORPORATION, Hiroshima-Shi, Hiroshima (JP)

( * ) Notice: Subject to any disclaimer, the term of this patent is extended or adjusted under 35 U.S.C. 154(b) by 0 days.

(21) Appl. No.: 15/108,449

(22) PCT Filed: Feb. 5, 2015

(86) PCT No.: PCT/JP2015/053294
§ 371 (c)(1),
(2) Date: Jun. 27, 2016

(87) PCT Pub. No.: WO2016/125293
PCT Pub. Date: Aug. 11, 2016

(65) Prior Publication Data
US 2016/0361697 A1    Dec. 15, 2016

(51) Int. Cl.
*B29B 7/24* (2006.01)
*B01F 15/02* (2006.01)
(Continued)

(52) U.S. Cl.
CPC .............. *B01F 15/026* (2013.01); *B01F 7/04* (2013.01); *B29B 7/22* (2013.01); *B29B 7/246* (2013.01);
(Continued)

(58) Field of Classification Search
CPC ....... B29B 7/7495; B29B 7/283; B29B 7/246; B29B 7/401; B29B 7/22; B29B 7/183; B29B 7/263; B01F 15/026; B01F 7/04
(Continued)

(56) References Cited

U.S. PATENT DOCUMENTS 4,084,263 A     4/1978 Millauer
4,512,664 A *   4/1985 Oiwa ...................... B29B 7/246
(Continued)

FOREIGN PATENT DOCUMENTS

CN     201587048 U       9/2010
DE     102009003606 A1 * 9/2010    ............. B29B 7/183
(Continued)

OTHER PUBLICATIONS

Taiwan Patent Office, "Notice of Allowance for Taiwanese Patent Application No. 104103933," Sep. 10, 2016.
(Continued)

*Primary Examiner* — Charles Cooley
(74) *Attorney, Agent, or Firm* — Manabu Kanesaka; Benjamin J. Hauptman; Kenneth Berner (57) ABSTRACT

A mixer includes: a casing having an introduction port at an upper portion and having a rotor provided with a blade portion for mixing a material to be mixed, inside thereof; a floating weight which blocks the introduction port; and a floating weight moving mechanism which has a horizontal movement unit capable of horizontally moving the floating weight in a supported state between a delivery position just above the introduction port and a retracted position being
(Continued)

lateral to the introduction port, on the upper side of the introduction port, and can move the floating weight separately from the horizontal movement unit from the delivery position to a blocking position at which the floating weight blocks the introduction port.

5 Claims, 6 Drawing Sheets

(51) Int. Cl.
| | | |
|---|---|---|
| | *B29B 7/74* | (2006.01) |
| | *B01F 7/04* | (2006.01) |
| | *B29B 7/22* | (2006.01) |
| | *B29B 7/18* | (2006.01) |
| | *B29B 7/26* | (2006.01) |
| | *B29B 7/28* | (2006.01) |

(52) U.S. Cl.
CPC ............ *B29B 7/7495* (2013.01); *B29B 7/183* (2013.01); *B29B 7/263* (2013.01); *B29B 7/283* (2013.01)

(58) Field of Classification Search
USPC ................................................ 366/76.7, 76.8
See application file for complete search history.

(56) References Cited

U.S. PATENT DOCUMENTS

| | | | | |
|---|---|---|---|---|
| 5,529,390 | A | * | 6/1996 | Giani ...................... B29B 7/183 366/76.6 |
| 6,811,295 | B2 | | 11/2004 | Koro et al. |
| 2014/0291876 | A1 | * | 10/2014 | Yada ........................ B29B 7/183 |
| 2016/0361697 | A1 | * | 12/2016 | Urakami ................ B29B 7/183 |

FOREIGN PATENT DOCUMENTS

| | | |
|---|---|---|
| JP | S59-145024 A | 8/1984 |
| JP | H07-303824 A | 11/1995 |
| JP | H10-058443 A | 3/1998 |
| JP | H10-264158 A | 10/1998 |
| JP | 2003-144884 A | 5/2003 |
| JP | 2014-205867 A | 10/2014 |
| TW | M479837 U | 6/2014 |

OTHER PUBLICATIONS

PCT/ISA/210, "International Search Report for International Application No. PCT/JP2015/053294," Apr. 7, 2015.

PCT/ISA/237, "Written Opinion of the International Searching Authority for International Application No. PCT/JP2015/053294," Apr. 7, 2015.

* cited by examiner

MIXER PROVIDED WITH FLOATING WEIGHT MOVING MECHANISM

RELATED APPLICATIONS

The present application is National Phase of International Application No. PCT/JP2015/053294 filed Feb. 5, 2015, the disclosure of which is hereby incorporated by reference herein in its entirety.

TECHNICAL FIELD

The present invention relates to a mixer which mixes a material to be mixed.

BACKGROUND ART

A mixer for producing mixed rubber which is a material of a rubber product by mixing a material to be mixed with various additives blended with, for example, raw rubber by rotating a pair of mixing rotors in a casing is generally known.

An introduction port for introducing the material to be mixed is provided at a casing of the mixer. During mixing, the introduction port is blocked by a floating weight, and when introducing the material to be mixed through the introduction port, the floating weight is moved to a position at which it does not interfere with the introduction of the material to be mixed.

A mixer disclosed in PTL 1 is provided with a mechanism for moving a unit composed of a floating weight and an air cylinder which lifts and lowers the floating weight, in a horizontal direction, for the purpose of reducing the height of the mixer.

CITATION LIST

Patent Literature

[PTL 1] Japanese Unexamined Patent Application Publication No. S59-145024

SUMMARY OF INVENTION

Technical Problem

However, in the mixer disclosed in PTL 1, the air cylinder for lifting and lowering the floating weight has a shape extending further upward than the floating weight, and therefore, the downsizing of the mixer is not sufficient. That is, in the mixer disclosed in PTL 1, the floating weight and the air cylinder for lifting and lowering the floating weight are integrated with each other, and therefore, it is not possible to sufficiently reduce the height of the mixer.

The present invention has an object to provide a mixer in which it is possible to lower a height in a vertical direction.

Solution to Problem

According to a first aspect of the present invention, there is provided a mixer including: a casing having an introduction port at an upper portion and having a rotor provided with a blade portion for mixing a material to be mixed, inside thereof; a floating weight which blocks the introduction port; and a floating weight moving mechanism which has a horizontal movement unit capable of horizontally moving the floating weight in a supported state between a delivery position just above the introduction port and a retracted position being lateral to the introduction port, on the upper side of the introduction port, and can move the floating weight separately from the horizontal movement unit from the delivery position to a blocking position at which the floating weight blocks the introduction port.

According to such a configuration, due to a structure in which at the time of the introduction of the material to be mixed, the floating weight is moved to the retracted position being above the introduction port and lateral to the introduction port, it is possible to reduce the height of the retracted position of the floating weight. That is, it is possible to make the vertical height of the mixer low.

In the mixer described above, the floating weight moving mechanism may have a lifting unit which vertically lifts and lowers the floating weight in a supported state between the delivery position and the blocking position at which the floating weight blocks the introduction port, and can deliver the floating weight between itself and the horizontal movement unit at the delivery position.

According to such a configuration, the floating weight can be lifted and lowered to any position, whereby it is possible to simplify the structure of the horizontal movement unit. That is, it is possible to make the horizontal movement unit have, for example, a configuration in which only the fork which moves in the horizontal direction is included.

In the mixer described above, the mixer may further include: a restriction mechanism which restricts an upward movement of the floating weight which is located at the blocking position.

According to such a configuration, during the mixing of the material to be mixed, it is possible to restrict an upward movement of the floating weight.

In the mixer described above, the floating weight may be provided with a main body part which blocks the introduction port, and a protrusion part which extends upward from the main body part.

In the mixer described above, the restriction mechanism may press the protrusion part from above.

In the mixer described above, the restriction mechanism or the protrusion part may have an elastic body part which is elastically deformed with respect to a reaction force from the material to be mixed in the casing.

According to such a configuration, an impact which is applied to the floating weight can be absorbed by elastic body part.

Advantageous Effects of Invention

According to the present invention, it is possible to make the vertical height of the mixer low.

DESCRIPTION OF EMBODIMENTS (First Embodiment)

Hereinafter, a mixer 1 of a first embodiment of the present invention will be described in detail with reference to the drawings.

The mixer 1 of this embodiment is an apparatus for producing a mixed product by mixing a material to be mixed which is composed to include, for example, raw rubber or the like.

Figure 1:
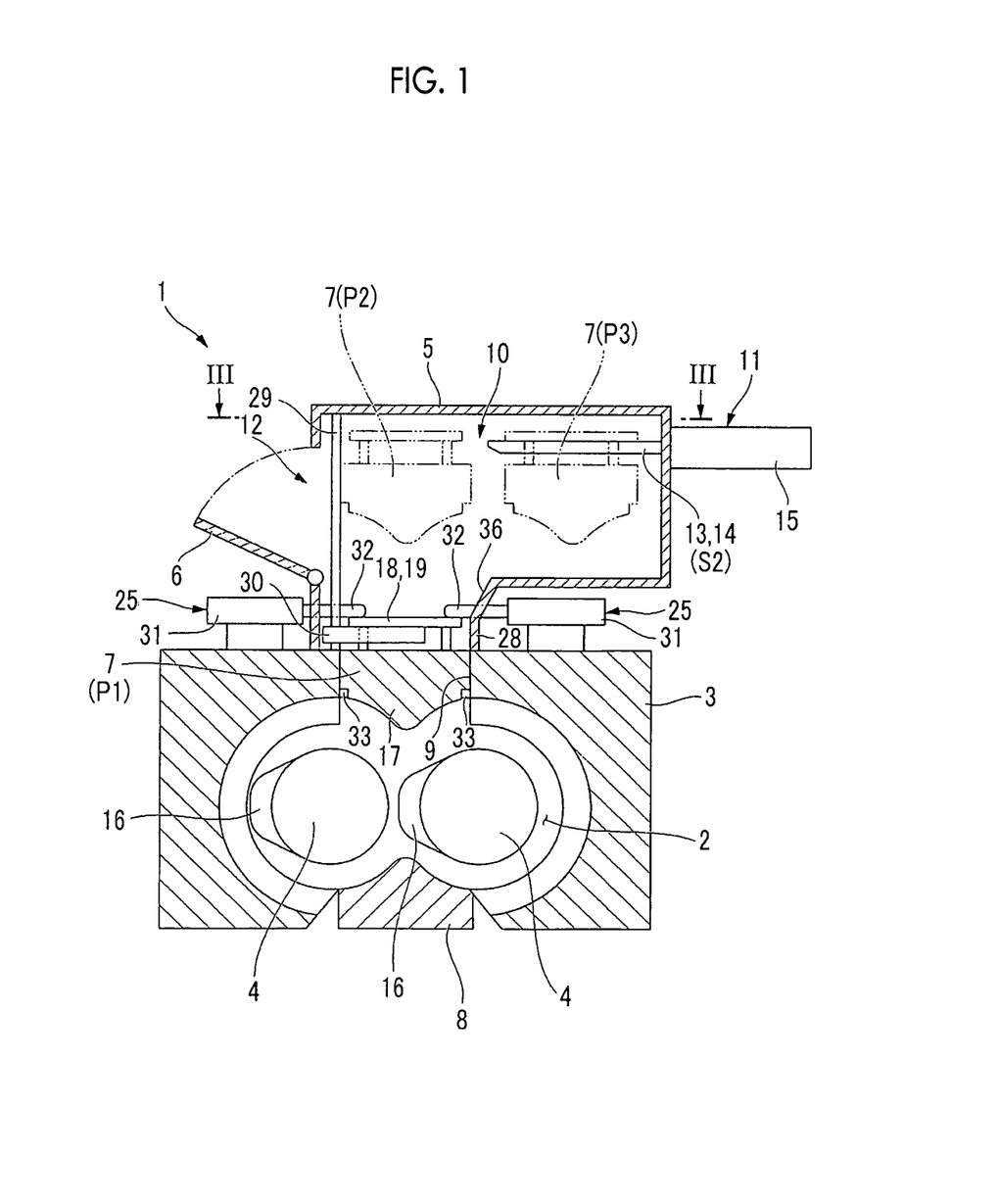
FIG. 1 is a vertical sectional view showing the configuration of a mixer of a first embodiment of the present invention.

As shown in FIG. 1, the mixer 1 of this embodiment has a casing 3 in which a mixing chamber 2 is provided inside thereof, a pair of mixing rotors 4 disposed in the mixing chamber 2, a frame 5 provided with a hopper 6 into which a material to be mixed G (refer to FIG. 4) is introduced, a floating weight 7 which presses the material to be mixed G into the mixing chamber 2 by blocking an introduction port 9 formed at an upper portion of the casing 3, and a floating weight moving mechanism 10 which moves the floating weight 7.

The mixer 1 is a so-called internal mixer which mixes the material to be mixed G by using the mixing rotors 4 in a state where the material to be mixed G introduced from the hopper 6 is introduced into the mixing chamber 2 and the introduction port 9 is blocked by the floating weight 7.

The pair of mixing rotors 4 is disposed so as to be parallel to each other in the mixing chamber 2. The pair of mixing rotors 4 is rotatable in the opposite directions to each other by a drive source (not shown).

A blade portion 16 overhanging toward the outside is formed on the outer surface of each of the pair of mixing rotors 4. The blade portion 16 is formed, for example, to be twisted in a spiral shape with respect to the axis of the mixing rotor 4. The blade portions 16 are disposed so as to mesh with each other by the rotation of the mixing rotors 4.

The hopper 6 is provided at an upper portion of the frame 5.

The frame 5 has a side wall 28 formed so as to extend the side surface of the introduction port 9. That is, the inner surface of the side wall 28 of the frame 5 is formed so as to be flush with the side surface of the introduction port 9. The side wall 28 has a slope 36 in which a position in a horizontal direction becomes more distant from the introduction port 9 as it goes toward the upper side.

A drop door 8 for ejecting the material to be mixed G which has been mixed, to the outside, is mounted on a bottom portion of the casing 3 so as to be able to be opened and closed.

Figure 2:
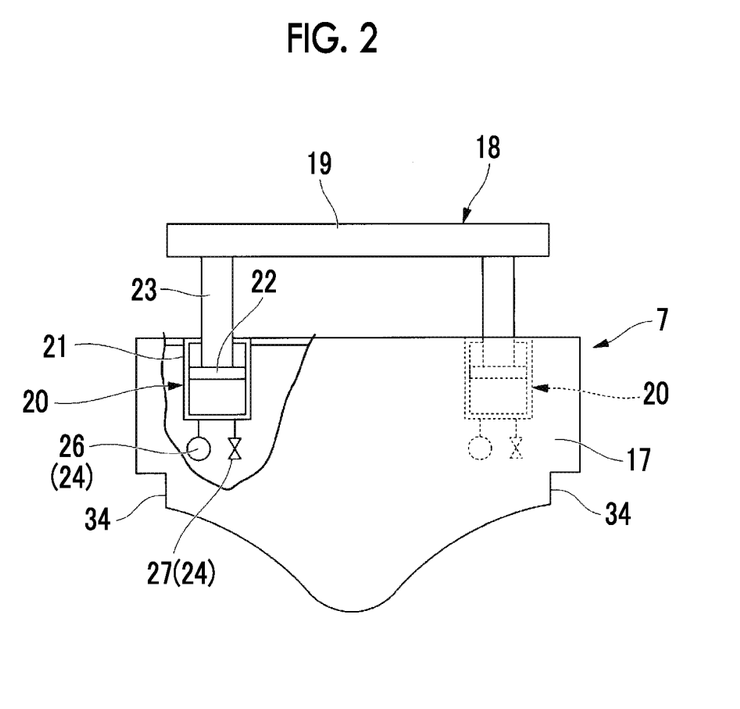
FIG. 2 is a schematic configuration diagram of a floating weight of the mixer of the first embodiment of the present invention.

As shown in FIG. 2, the floating weight 7 has a main body part 17 which blocks the introduction port 9, and a protrusion part 18 which extends upward from the main body part 17.

The main body part 17 is a block-shaped member capable of opening and closing the introduction port 9. The main body part 17 is formed in a rectangular shape which is approximately the same shape as the introduction port 9 when viewed from above.

The protrusion part 18 has a plate-like part 19, and a plurality of cylinder units 20 connecting the plate-like part 19 and the main body part 17.

The plate-like part 19 is a plate-like member which has a rectangular plate shape and has approximately the same shape as the main body part 17 when viewed from above. A predetermined space is formed between the plate-like part 19 and the main body part 17.

The cylinder unit 20 has a cylinder main body 21 having a tubular shape, a piston 22 disposed so as to divide the inside of the cylinder main body 21 into two in a longitudinal direction of the cylinder main body 21 and to be movable in the longitudinal direction of the cylinder main body 21, and a piston rod 23 which is connected to the piston 22 and extends upward from the cylinder main body 21. The cylinder unit 20 is a so-called shock absorber (a damper unit). The cylinder unit 20 functions as an elastic body part which is elastically deformed in a case where a force is applied to the floating weight 7 in an up-and-down direction.

As an alternative to the cylinder unit 20, for example, a compression coil spring may be disposed as an elastic body part. That is, as a member connecting the plate-like part 19 and the main body part 17 of the floating weight 7, as long as it is a member which is elastically deformed, it may be appropriately adopted.

The cylinder main body 21 of the cylinder unit 20 is fixed to the main body part 17 of the floating weight 7. The piston rod 23 of the cylinder unit 20 protrudes further upward than the upper surface of the main body part 17 of the floating weight 7 and is connected to the plate-like part 19. That is, the plate-like part 19 is pressed from above, whereby the piston 22 compresses air enclosed in the cylinder main body 21, through the piston rod 23.

The cylinder unit 20 has a release mechanism 24 composed of a pressure measuring device 26 which measures air pressure in the piston 22 and a valve 27 which releases air to the outside of the piston 22 according to the air pressure in the piston 22. The pressure measuring device 26 and the valve 27 are connected to a control device (not shown).

The control device monitors the air pressure in the piston 22 during the mixing. The control device issues a command to make the valve 27 be in an open state, in a case where the air pressure in the piston 22 exceeds a predetermined value. In this way, in a case where the air pressure in the piston 22 exceeds the predetermined value, air is released from the piston 22.

As shown in FIG. 1, a projection 33 preventing the floating weight 7 from falling into the mixing chamber 2 is formed at the casing 3. Corresponding to this, a notch 34 which is engaged with the projection 33 is formed in the main body part 17 of the floating weight 7, as shown in FIG. 2.

The floating weight moving mechanism 10 is a mechanism for moving the floating weight 7 between a blocking position P1 at which the floating weight 7 blocks the introduction port 9, a delivery position P2 just above (vertically above, directly above) the blocking position P1, and a retracted position P3 being lateral to the delivery position P2.

The floating weight moving mechanism 10 has a horizontal movement unit 11 which can horizontally move the floating weight 7 in a supported state, on the upper side of the introduction port 9 and between the delivery position P2 just above the introduction port 9 and the retracted position P3 being lateral to the introduction port 9.

The floating weight moving mechanism 10 has a lifting unit 12 which vertically lifts and lowers the floating weight 7 in a supported state between the delivery position P2 and the blocking position P1 and can deliver the floating weight 7 between itself and the horizontal movement unit 11 at the delivery position P2.

The horizontal movement unit 11 is a mechanism which can horizontally move the floating weight 7 while supporting it, on the upper side of the introduction port 9. The horizontal movement unit 11 has a fork 13, and a fork drive unit 15 which moves the fork 13 in the horizontal direction.

Figure 3:
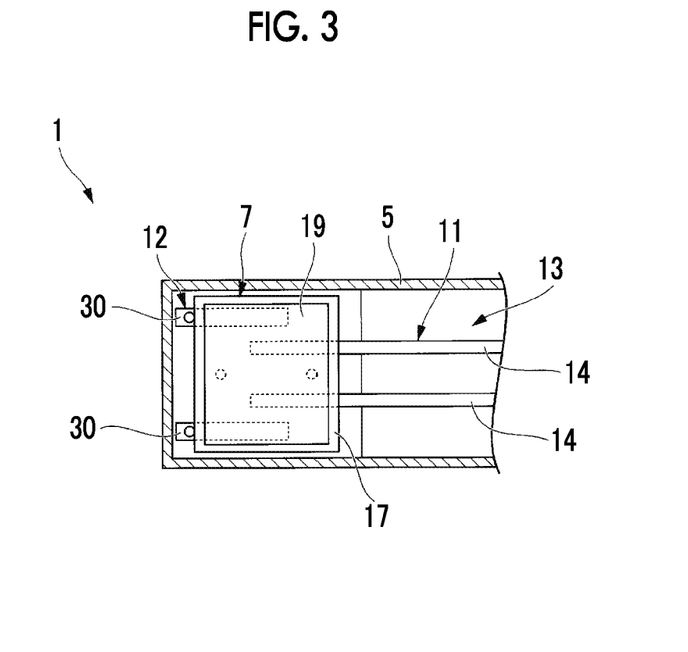
FIG. 3 is a view in the direction of an arrow III-III of FIG. 1 and is a plan view of a floating weight moving mechanism of the first embodiment of the present invention.

As shown in FIG. 3, the fork 13 is composed of a pair of fork members 14. The fork member 14 is a rod-shaped member extending in the horizontal direction and has an upper surface which is a planar surface. The pair of fork members 14 is provided parallel to each other such that a longitudinal direction thereof conforms to the horizontal direction.

The fork drive unit 15 is a drive unit which moves the fork 13 in the horizontal direction while maintaining the horizontal state of the fork 13. The fork drive unit 15 can be fixed to, for example, the casing 3 through a bracket (not shown).

The fork 13 expands and contracts between a first stroke position S1 (refer to FIG. 5) at which the fork 13 supports the floating weight 7 which is located at the delivery position P2, and a second stroke position S2 (refer to FIG. 4) at which the fork 13 supports the floating weight 7 which is located at the retracted position P3, by the fork drive unit 15. The fork 13 is inserted between the plate-like part 19 and the main body part 17 of the floating weight 7, whereby the floating weight 7 is supported.

As shown in FIG. 1, the lifting unit 12 has a pair of shafts 29 extending vertically upward from the upper surface of the casing 3, and a pair of weight support plates 30 which can move up and down along the shafts 29. The lifting unit 12 uses a ball screw mechanism. In the shaft 29, a screw groove is formed in the outer peripheral surface. The weight support plate 30 has a nut (not shown) which is screwed to the screw groove of the shaft 29, and a plurality of balls are interposed between the nut and the screw groove of the shaft 29.

The weight support plates 30 are vertically lifted and lowered by rotating the shafts 29 by a motor (not shown).

The weight support plate 30 is a plate-like member which supports the floating weight 7 by being inserted between the plate-like part 19 and the main body part 17 of the floating weight 7.

The shaft 29 is disposed such that the outer peripheral surface thereof conforms to the inner peripheral surface of the introduction port 9. In this way, the position in the horizontal direction of the floating weight 7 can be restrained by the shaft 29. That is, it is possible to make the shaft 29 be a guide of the floating weight 7. A configuration may be made in which the outer peripheral surface of the shaft 29 is not disposed so as to conform to the inner peripheral surface of the introduction port 9 and a plate-shaped (or rod-shaped) guide which guides the floating weight 7 in the horizontal position during the lifting and lowering thereof is separately provided. Further, a guide need not be necessarily provided.

As a mechanism which realizes the lifting and lowering of the weight support plate 30 in the lifting unit 12, there is no limitation to a ball screw, and a hydraulic cylinder mechanism may be used as a structure for lifting and lowering the weight support plate 30.

As shown in FIG. 3, the fork 13 and the weight support plate 30 are disposed so as not to interfere with each other when viewed in a planar view. Specifically, the fork 13 is disposed so as to be inserted between the pair of weight support plates 30. The weight support plate 30 may be integrally formed if it can avoid interference with the fork 13 and the piston rod 23 of the cylinder unit 20. The fork 13 may be integrally formed if it can avoid interference with the fork 13 and the piston rod 23 of the cylinder unit 20.

The mixer 1 is provided with a restriction mechanism which restricts an upward movement of the floating weight 7 disposed at the blocking position P1. The restriction mechanism 25 is configured of an actuator such as a hydraulic cylinder. Specifically, the restriction mechanism 25 has a restriction mechanism main body 31 fixed to the upper surface of the casing 3, and a stopper 32 stretchable from the restriction mechanism main body 31.

The restriction mechanism 25 can move the stopper 32 between a position at which the stopper 32 is brought into contact with the upper surface of the plate-like part 19 of the floating weight 7 in a case where the floating weight 7 is located at the blocking position P1 (or, a position at which a slight gap is formed between the stopper 32 and the plate-like part 19, hereinafter referred to as a stopper protrusion position), and a position at which the stopper 32 does not interfere with the floating weight 7 at the time of the lifting and lowering of the floating weight 7 (hereinafter referred to as a stopper retraction position).

Next, an operation of the mixer 1 of this embodiment will be described.

Figure 4:
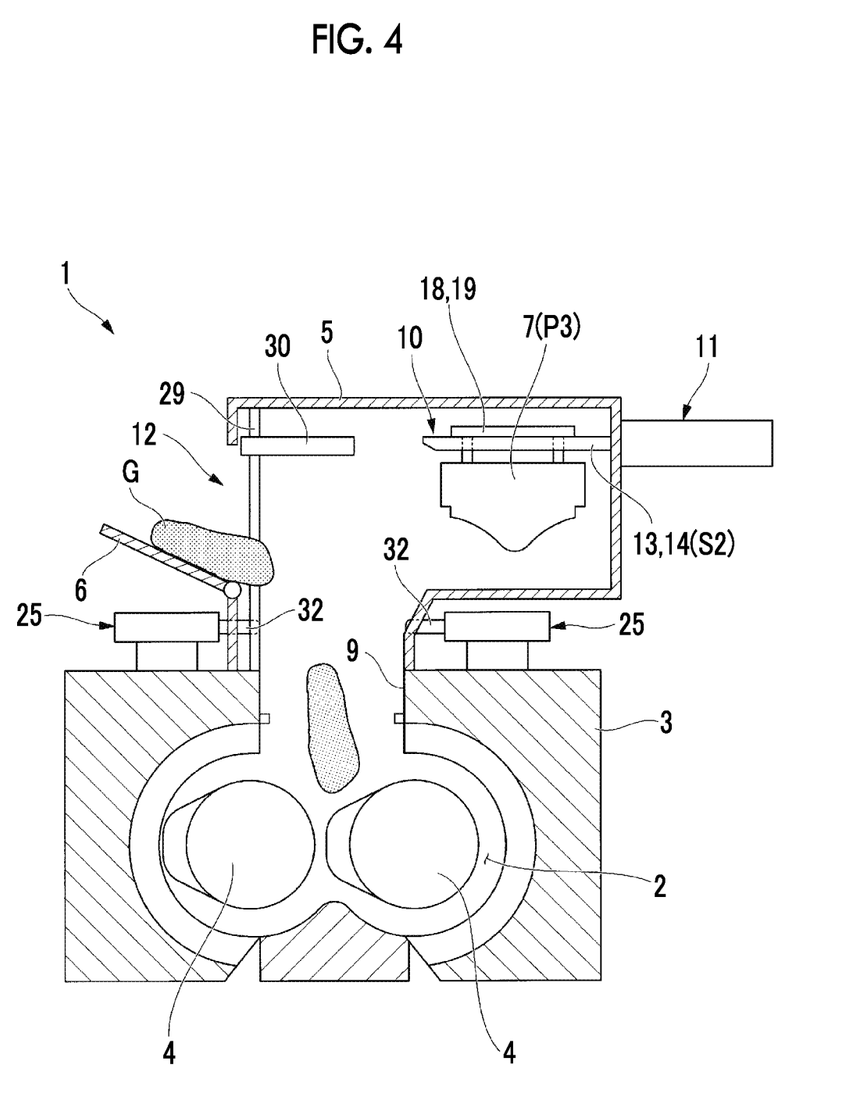
FIG. 4 is a diagram describing an operation of the mixer of the first embodiment of the present invention and is a diagram showing a state where the floating weight is located at a retracted position.

As shown in FIG. 4, when introducing the material to be mixed G into the mixing chamber 2, the hopper 6 is made to be in an open state and the floating weight 7 is located at the retracted position P3. That is, the fork 13 of the horizontal movement unit 11 is pulled to the fork drive unit 15 side, whereby the fork 13 is moved to the second stroke position S2 shown in FIG. 4. In this way, the floating weight 7 supported on the fork 13 is disposed at the retracted position P3.

After the material to be mixed G is introduced into the mixing chamber 2, the floating weight 7 is moved to the blocking position P1.

Figure 5:
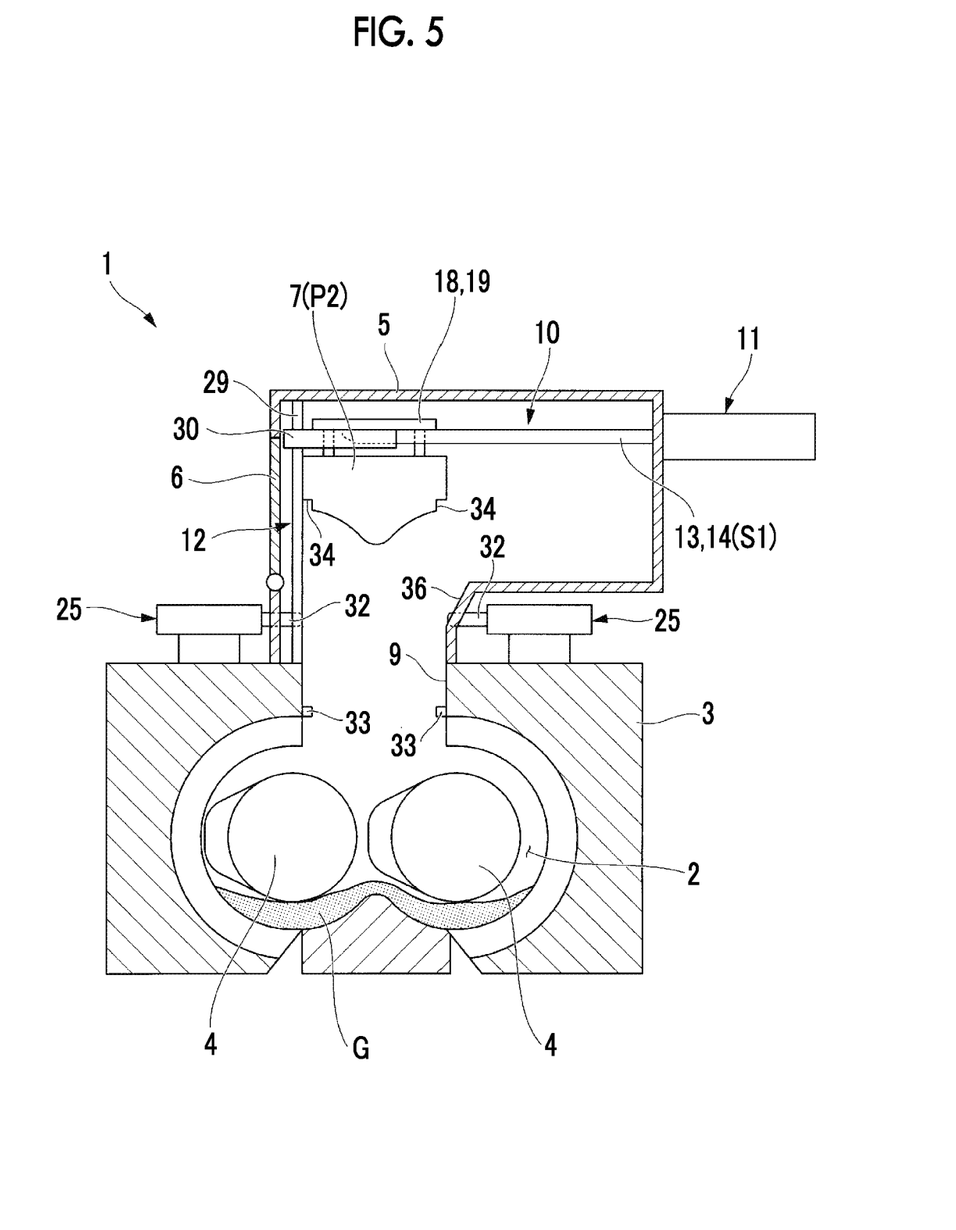
FIG. 5 is a diagram describing an operation of the mixer of the first embodiment of the present invention and is a diagram showing a state where the floating weight is located at a delivery position.

First, as shown in FIG. 5, the fork 13 of the horizontal movement unit 11 is extracted to the side opposite to the fork drive unit 15, thereby moving the floating weight 7 to the delivery position P2. That is, the fork 13 is moved to the first stroke position S1 shown in FIG. 5. Specifically, the floating weight 7 is moved in the horizontal direction until the side surface of the floating weight 7 comes into contact with the shafts 29 of the lifting unit 12.

At this time, the lifting unit 12 disposes the weight support plate 30 at a height at which the weight support plate 30 is inserted between the plate-like part 19 and the main body part 17 of the floating weight 7. In other words, when moving the floating weight 7 from the retracted position P3 to the delivery position P2, it is necessary to move the floating weight 7 to a position at which the upper surface of the weight support plate 30 is slightly lower than the upper surface of the fork 13, by operating the lifting unit 12.

Subsequently, the lifting unit 12 is operated, whereby the floating weight 7 is slightly raised such that the load of the floating weight 7 is not applied to the fork 13. That is, the floating weight 7 is delivered from the fork 13 of the horizontal movement unit 11 to the weight support plate 30 of the lifting unit 12.

Subsequently, the fork 13 is retracted to the second stroke position S2. That is, the fork 13 is pulled back such that the floating weight 7 and the fork 13 do not interfere with each other when lowering the floating weight 7. In this way, the floating weight 7 is separated from the horizontal movement unit 11 and supported by the weight support plate 30 of the lifting unit 12.

Figure 6:
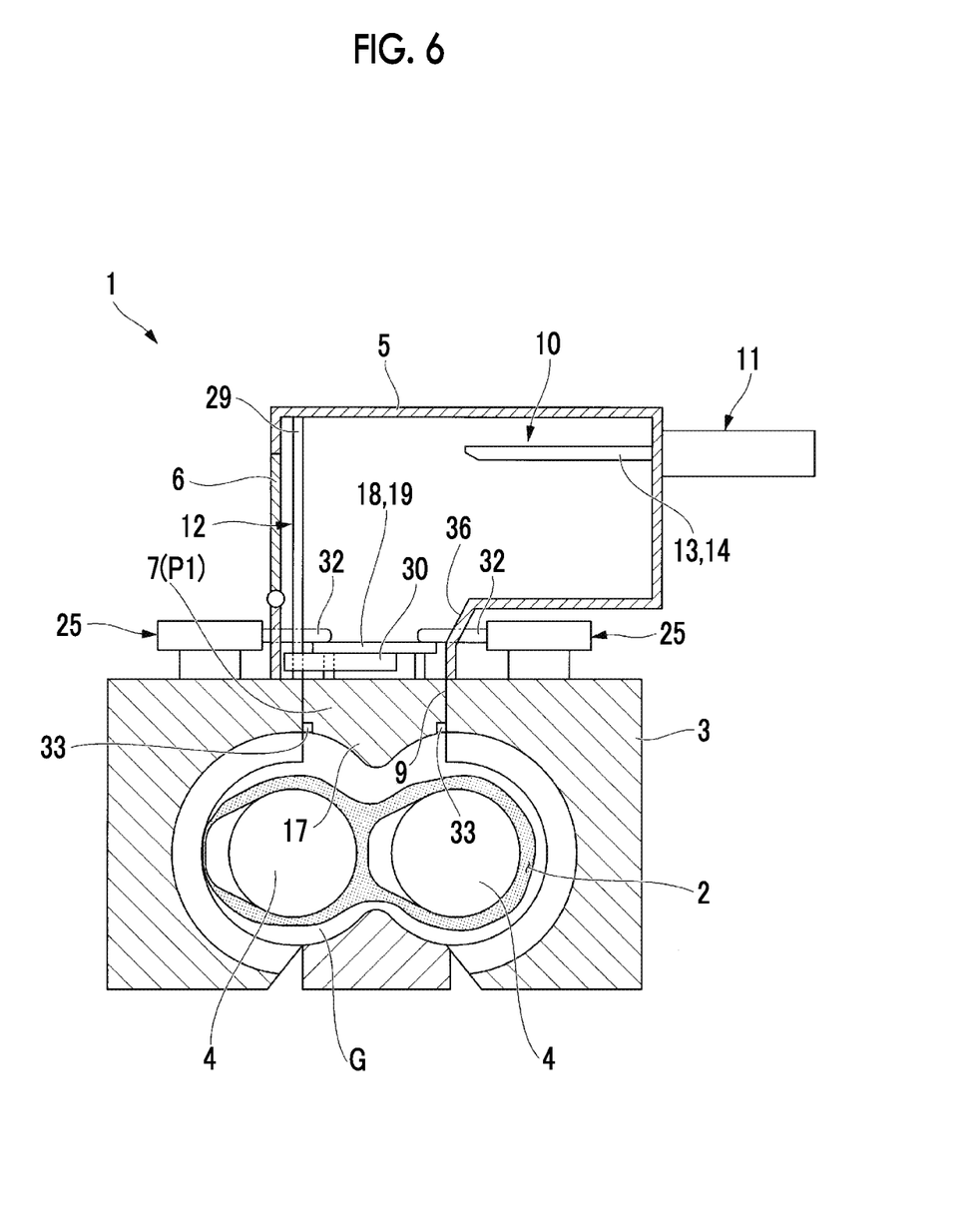
FIG. 6 is a diagram describing an operation of the mixer of the first embodiment of the present invention and is a diagram showing a state where the floating weight is located at a blocking position.

Next, the floating weight 7 is moved from the delivery position P2 to the blocking position P1. That is, the introduction port 9 is blocked by the floating weight 7. When lowering the floating weight 7 from the delivery position P2, the stopper 32 of the restriction mechanism 25 is located at the stopper retraction position. That is, the stopper 32 is disposed at a position at which the stopper 32 does not interfere with the upward and downward movement of the floating weight 7.

First, the lifting unit 12 is operated, whereby the floating weight 7 is lowered until the notch 34 of the floating weight 7 is engaged with the projection 33 of the casing 3. At this time, the floating weight 7 is guided to a position in the horizontal direction, which is just above the introduction port 9 by the shafts 29 of the lifting unit 12 and the slope 36 of the frame 5.

Subsequently, the restriction mechanism 25 is operated, whereby the stopper 32 is located at the stopper protrusion position. In this way, the introduction port 9 is blocked by the floating weight 7.

The mixed material introduced through the hopper 6 is pressed into the mixing chamber 2 by the floating weight 7 and then mixed by shearing action which is generated between the mixing rotors 4 which are rotated in the opposite directions to each other and between the mixing rotors 4 and the inner surface of the mixing chamber 2. At this time, an impact which is applied to the floating weight 7 is absorbed by the cylinder unit 20. That is, air in the cylinder main body 21 of the cylinder unit 20 is compressed, whereby the impact which is applied to the floating weight 7 is mitigated.

Further, the protrusion part 18 of the floating weight 7 has the release mechanism 24, whereby the displacement of the floating weight 7 can be allowed in a case where a reaction force from a mixed material in the mixing chamber 2 becomes greater than or equal to a predetermined value. Due to the release mechanism 24, it is possible to prevent the cylinder unit 20 from being damaged by excessive pressure.

Then, the mixed material is ejected to the outside of the mixing chamber 2 by opening the drop door 8 provided at the bottom portion of the mixing chamber 2.

According to the embodiment described above, due to a configuration in which at the time of the introduction of the material to be mixed G, the floating weight 7 is moved to the retracted position P3 being above the introduction port 9 and lateral to the introduction port 9, it is possible to reduce the height of the retracted position P3 of the floating weight 7. That is, it is possible to make the vertical height of the mixer 1 low.

In this way, for example, in a tandem type system which is provided with two mixers connected in an up-and-down direction, it becomes possible to provide a floating weight at the lower mixer as well.

Further, the floating weight moving mechanism 10 has the lifting unit 12, whereby the floating weight 7 can be lifted and lowered to any position. In this way, it is possible to simplify the structure of the horizontal movement unit 11. That is, it is possible to make the horizontal movement unit 11 have, for example, a configuration in which only the fork 13 which moves in the horizontal direction is included.

Further, the restriction mechanism 25 which restricts the upward movement of the floating weight 7 which is located at the blocking position P1 is provided, whereby during the mixing of the material to be mixed G, it is possible to restrict the upward movement of the floating weight 7.

Further, the cylinder unit 20 functions as an elastic body part which is elastically deformed with respect to a reaction force from the material to be mixed G in the mixing chamber 2, whereby it is possible to absorb an impact which is applied to the floating weight 7 during the mixing.

Further, due to the release mechanism 24, in a case where a reaction force from the mixed material in the mixing chamber 2 becomes greater than or equal to a predetermined value, the displacement of the floating weight 7 is allowed, whereby in a case where an excessive reaction force is applied from the material to be mixed G, it is possible to prevent the protrusion part 18 from being damaged.

(Second Embodiment)

Hereinafter, a mixer 1B of a second embodiment of the present invention will be described based on the drawing. In addition, in this embodiment, description will be made focusing on differences from the first embodiment described above, and with respect to the same portions, description thereof will be omitted.

Figure 7:
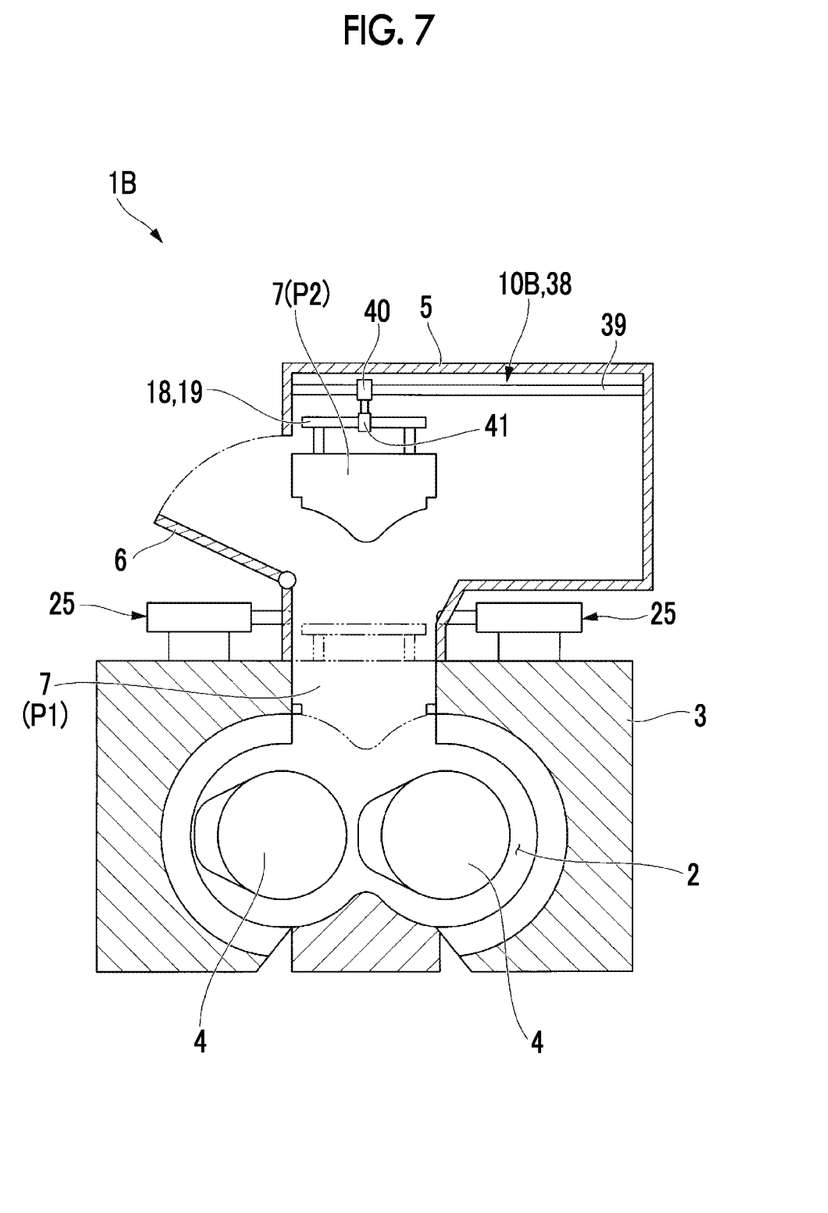
FIG. 7. is a vertical sectional view showing the configuration of a mixer of a second embodiment of the present invention.

As shown in FIG. 7, the mixer 1B of this embodiment is different from the mixer 1 of the first embodiment in terms of the configuration of the floating weight moving mechanism.

A floating weight moving mechanism 10B of this embodiment has a crane unit 38 having the function of the horizontal movement unit 11 of the first embodiment.

The crane unit 38 has a rail 39 provided along the horizontal direction at the uppermost portion of the frame 5, and an arm 40 provided so as to be movable on the rail 39.

The arm 40 has a hand portion 41 capable of gripping the plate-like part 19 of the floating weight 7. That is, the crane unit 38 of this embodiment can support the floating weight 7 by using the arm 40. Further, the crane unit 38 can move the floating weight 7 from the retracted position P3 (refer to FIG. 1) to the delivery position P2.

In the mixer 1B of this embodiment, in a case of moving the floating weight 7 from the delivery position P2 to the blocking position P1, the floating weight 7 is freely fallen from the delivery position P2.

Further, by using the arm 40 which can expand and contract in the up-and-down direction, it is possible to move the floating weight 7 to the blocking position P1 without freely falling it.

The embodiments of the present invention have been described in detail above with reference to the drawings. However, each configuration, combinations thereof, or the like in each embodiment is an example, and addition, omission, substitution, and other changes in a configuration can be made within a scope which does not depart from the gist of the present invention. Further, the present invention is not limited by the embodiments, but is limited only by the scope of the appended claims.

In the mixers 1 and 1B of the embodiments described above, the cylinder unit 20 functioning as an elastic body part is provided at the protrusion part 18 of the floating weight 7. However, there is no limitation thereto. A member functioning as an elastic body part may be provided on the lower surface of the stopper 32 of the restriction mechanism 25. That is, a shock absorber may be provided at at least one of the floating weight 7 and the stopper 32.

REFERENCE SIGNS LIST 1, 1B: mixer
2: mixing chamber

3: casing
4: mixing rotor
5: frame
6: hopper
7: floating weight
8: drop door
9: introduction port
10, 10B: floating weight moving mechanism
11: horizontal movement unit
12: lifting unit
13: fork
14: fork member
15: fork drive unit
16: blade portion
17: main body part
18: protrusion part
19: plate-like part
20: cylinder unit
21: cylinder main body
22: piston
23: piston rod
24: release mechanism
25: restriction mechanism
26: pressure measuring device
27: valve
29: shaft
30: weight support plate
31: restriction mechanism main body
32: stopper
33: projection
34: notch
36: slope
38: crane unit
39: rail
40: arm
41: hand portion
G: material to be mixed
P1: blocking position
P2: delivery position
P3: retracted position
S1: first stroke position
S2: second stroke position

The invention claimed is:

1. A mixer provided with a floating weight moving mechanism, comprising:
   a casing having an introduction port at an upper portion and having a rotor provided with a blade portion for mixing a material to be mixed, inside thereof; and
   a floating weight which blocks the introduction port,
   wherein the floating weight moving mechanism includes
      a horizontal movement unit capable of horizontally moving the floating weight in a supported state between a delivery position just above the introduction port and a retracted position being lateral to the introduction port, on the upper side of the introduction port, and
      a lifting unit which vertically lifts and lowers the floating weight in a supported state between the delivery position and the blocking position at which the floating weight blocks the introduction port, and being capable of delivering the floating weight between itself and the horizontal movement unit at the delivery position, and
      the floating weight moving mechanism is capable of moving the floating weight separately from the horizontal movement unit from the delivery position to a blocking position at which the floating weight blocks the introduction port.

2. The mixer provided with a floating weight moving mechanism according to claim 1, further comprising:
   a restriction mechanism which restricts an upward movement of the floating weight which is located at the blocking position.

3. The mixer provided with a floating weight moving mechanism according to claim 2, wherein the floating weight is provided with a main body part which blocks the introduction port, and a protrusion part which extends upward from the main body part.

4. The mixer provided with a floating weight moving mechanism according to claim 3, wherein the restriction mechanism presses the protrusion part from above.

5. The mixer provided with a floating weight moving mechanism according to claim 4, wherein the restriction mechanism or the protrusion part has an elastic body part which is elastically deformed with respect to a reaction force from the material to be mixed in the casing.

* * * * *